United States Patent
Jibbe et al.

(10) Patent No.: US 8,037,219 B2
(45) Date of Patent: Oct. 11, 2011

(54) SYSTEM FOR HANDLING PARALLEL INPUT/OUTPUT THREADS WITH CACHE COHERENCY IN A MULTI-CORE BASED STORAGE ARRAY

(75) Inventors: Mahmoud K. Jibbe, Wichita, KS (US);
Senthil Kannan, Pondicherry (IN);
Selvaraj Rasappan, Tamil Nadu (IN)

(73) Assignee: LSI Corporation, Milpitas, CA (US)

( * ) Notice: Subject to any disclaimer, the term of this patent is extended or adjusted under 35 U.S.C. 154(b) by 231 days.

(21) Appl. No.: 12/423,243

(22) Filed: Apr. 14, 2009

(65) Prior Publication Data
US 2010/0262730 A1 Oct. 14, 2010

(51) Int. Cl.
*G06F 3/00* (2006.01)
*G06F 13/00* (2006.01)

(52) U.S. Cl. .................. 710/40; 710/5; 710/52; 710/58; 711/100

(58) Field of Classification Search .................. None
See application file for complete search history.

(56) References Cited

U.S. PATENT DOCUMENTS 5,313,584 A * 5/1994 Tickner et al. ................. 710/37
2010/0250785 A1* 9/2010 Shin et al. ......................... 710/3

* cited by examiner

*Primary Examiner* — Alan Chen
(74) *Attorney, Agent, or Firm* — Christopher P. Maiorana, PC

(57) ABSTRACT

A system comprising a scheduler, a first core, and a second core. The scheduler may be configured to prioritize a plurality of input/output (IO) requests. The first core may be configured to process one of the plurality of IO requests based on the prioritizing of the plurality of IO requests. The second core may be configured to process a different one of the plurality of IO requests based on the prioritizing of the plurality of IO requests.

18 Claims, 3 Drawing Sheets

SYSTEM FOR HANDLING PARALLEL INPUT/OUTPUT THREADS WITH CACHE COHERENCY IN A MULTI-CORE BASED STORAGE ARRAY

CROSS REFERENCE TO RELATED APPLICATIONS

The present application may relate to co-pending application Ser. No. 12/395,786, filed Mar. 2, 2009, which is hereby incorporated by reference in its entirety.

FIELD OF THE INVENTION

The present invention relates to storage arrays generally and, more particularly, to a method and/or apparatus for handling parallel input/output threads with cache coherency in a multi-core based storage array.

BACKGROUND OF THE INVENTION

Conventional controllers in storage arrays implement uni-processor systems with input/output (IO) requests scheduled one at a time in a queue. Conventional systems do not implement parallel IO execution. Performance is limited since the IO queue has to wait for the previous operation to complete.

It would be desirable to implement a controller that handles multiple IO threads in parallel.

SUMMARY OF THE INVENTION

The present invention concerns a system comprising a scheduler, a first core, and a second core. The scheduler may be configured to prioritize a plurality of input/output (IO) requests. The first core may be configured to process one of the plurality of IO requests based on the prioritizing of the plurality of IO requests. The second core may be configured to process a different one of the plurality of IO requests based on the prioritizing of the plurality of IO requests.

The objects, features and advantages of the present invention include providing a method and/or apparatus to handle parallel input/output (IO) threads that may (i) implement cache coherency, (ii) be implemented in a multi-core based storage array, (iii) provide performance enhancement with multiple cores handling parallel IO requests, (iv) eliminate cache coherency issues with respect to IO requests handled in multiple cores and/or (v) eliminate data corruption with respect to old and new data processed by different cores.

BRIEF DESCRIPTION OF THE DRAWINGS

These and other objects, features and advantages of the present invention will be apparent from the following detailed description and the appended claims and drawings in which:

DETAILED DESCRIPTION OF THE PREFERRED EMBODIMENTS

Figure 1:
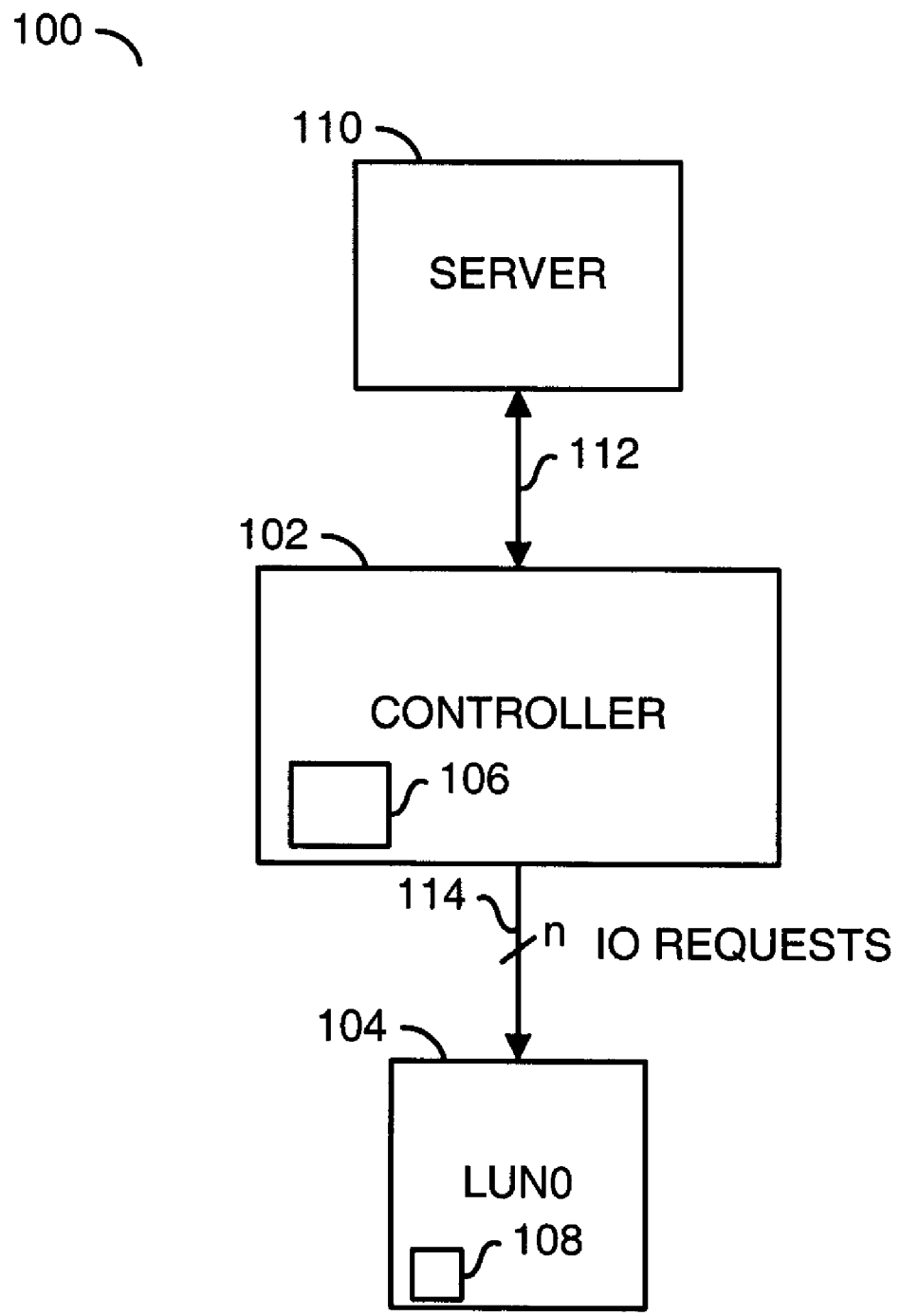
FIG. 1 is a block diagram illustrating an embodiment of the present invention.

Referring to FIG. 1, a block diagram of a system 100 is shown in accordance with an embodiment of the present invention. The system 100 generally comprises a module 102, a module 104, a device 110, a connection 112, and a connection 114. The module 102 may be implemented as a controller. The controller 102 may include a module 106. The module 106 may be implemented to store firmware (e.g., software) configured to operate the controller 102. The module 104 may be implemented as a LUN. In one example, the module 104 may be implemented as a LUN0. The module 104 may include a module 108. The module 108 may be implemented as a storage array. For example, the module 108 may represent an array of disk drives or other storage devices (e.g., solid state storage, etc.). The controller 102 may be connected to the device 110. The device 110 may be implemented as a server (e.g., a local server, a web server, etc.). The server 110 may be connected to the controller 102 through the connection 112. The controller 102 may be connected to the LUN 104 through the connection 114. The connection 112 and/or the connection 114 may be implemented as one or more network connections, such as a fibre channel connection. The controller 102 may send one or more requests (e.g., IO requests) to the LUN 104 through the connection 114.

Figure 2:
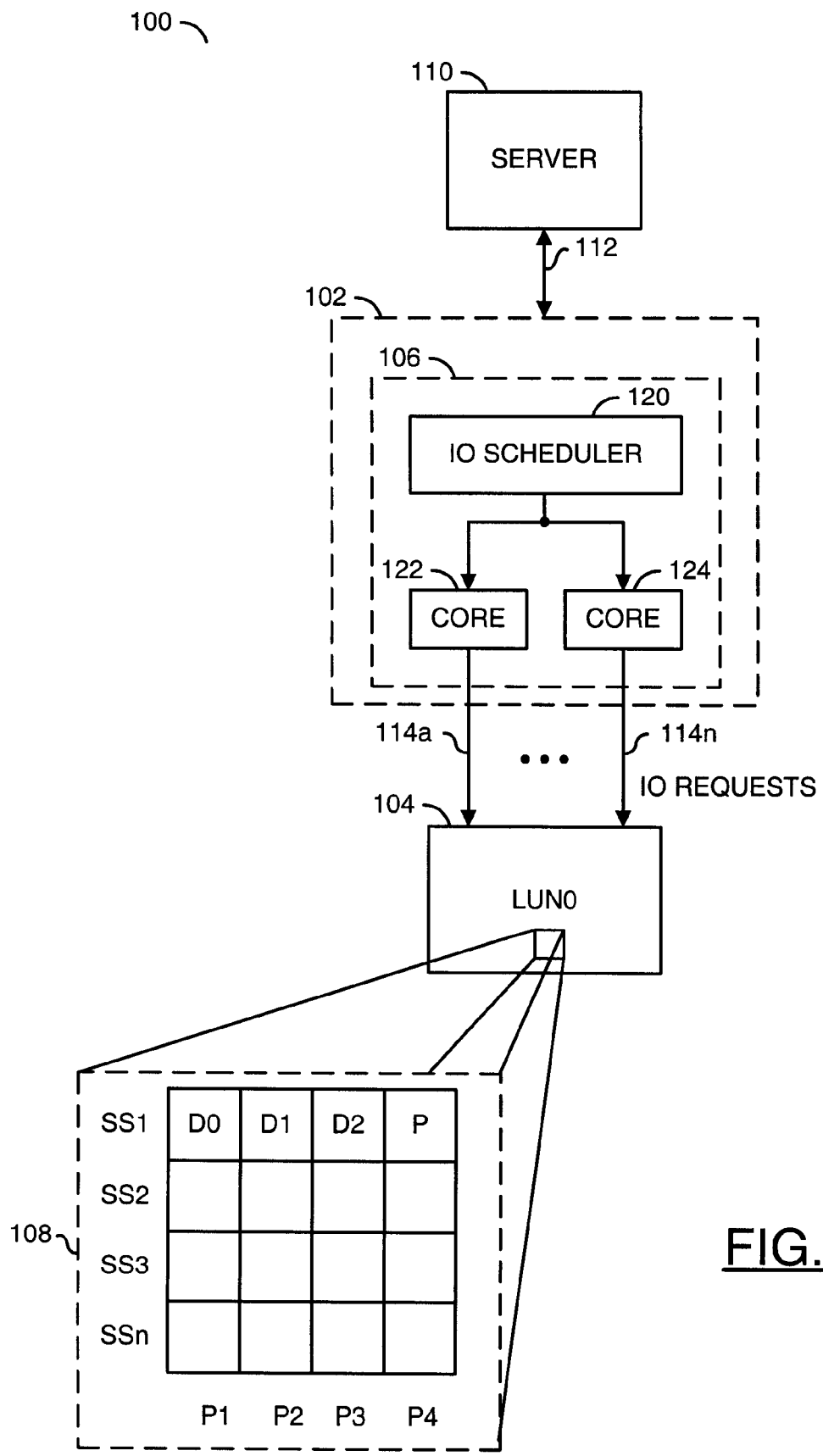
FIG. 2 is a more detailed block diagram of the system of FIG. 1.

Referring to FIG. 2, a more detailed diagram of the system 100 is shown. The module 106 may include a module 120, a module 122 and a module 124. The module 120 may be implemented as an IO scheduler. The module 122 may be implemented as a core. The module 124 may be implemented as a core. In one example, there may be multiple cores (e.g., two or more) in the module 106 depending on the design implemented. The core 122 and the core 124 may each include an internal cache. The modules 102, 104, 106, 108, 120, 122 and 124 may be implemented as hardware, software, a combination of hardware and software, or other implementations.

The core 122 and the core 124 may handle processing one or more input/output (IO) requests. The IO requests may be sent to the LUN 104 through one or more connections 114a-114n. The core 122 (e.g., a first core) may handle reconstruction and/or IO write processes (or requests). The core 124 (e.g., a second core) may handle IO read processes (or requests). In another example, the core 122 may be configured to handle read processes and/or requests and the core 124 may be configured to handle write processes and/or requests. The IO scheduler 120 may monitor and/or implement IO mapping between the cores 122 and 124. The IO scheduler 120 may monitor the IO mapping by assigning a particular IO request with tracking switches of a stripe-set (e.g., SS1-SSn). For example, the IO scheduler 120 may map a block (or sector) of the LUN 104 corresponding to an IO request written (or read) by the core 122 (or the core 124) in the stripe-set SS1 (e.g., D0, D1, D2, P).

The IO scheduler 120 may calculate and/or monitor a threshold of a IO queue depth. Examples of IO queues may be found in co-pending application Ser. No. 12/395,786, filed Mar. 2, 2009. The IO scheduler 120 may also handle IO priority switching. For example, the IO scheduler 120 may trigger an action for invalidating a pending IO read (or reads) to be served to the controller 102 within an allowable threshold based on a particular design implementation. The IO scheduler 120 may also trigger an action to update the respective cache within the core 122 or the core 124. Such updating may occur when an old value based on a mapping table and/or cached read addresses of one of the cores 122 or 124 is no longer current.

In general, the system 100 may implement a multi-core based storage array/controller. The controller 102 and the LUN 104 may implement a number of cores (e.g., the core 122 and the core 124) that may be configured to operate in a parallel configuration. In one example, the controller 102 may implement the cores (e.g., the core 122 and the core 124) to handle read or write IO requests. In another example, the controller 102 may have certain cores (e.g., the core 122) handling IO read requests and the other cores (e.g., the core 124) handling read and write IO requests. For example, more than one core may be implemented to handle IO read requests and more than one core may be implemented to handle IO write requests. The controller 102 may also provide an IO scheduling policy that may satisfy cache coherency specifications when parallel IO requests are implemented across multiple cores.

In one example, a plurality of the controllers 102 may be implemented. In such an implementation, each of the controllers 102 may have an IO scheduler 120 that may map and/or monitor incoming and outgoing IO requests. In a multi-core environment, the IO scheduler 120 may handle IO requests according to a variety of protocols (or policies). For example, the IO scheduler 120 may map and monitor the IO requests, stripe-set details, a queue depth configuration and a number of cores the IO scheduler 120 may need to assign. If a particular core (e.g., the core 122) needs to write to a stripe-set (e.g., SS1), the IO scheduler 120 may lock the read/write for other cores (e.g., the core 124). Once written to the stripe-set SS1, the IO scheduler 120 may trigger an update on the data corresponding to an address the IO scheduler 120 has written in a physical drive of the LUN 104. The IO requests may be sent to the LUN 104, which may translate the IO requests to the storage devices in the storage array 108.

While one LUN is shown, a number of LUNs may be implemented (e.g., up to 2048 or more) in a particular design. In the example shown, the storage array 108 may be implemented as four physical drives (or disks) (e.g., P1, P2, P3, P4). However, the particular number of drives may be varied to meet the design criteria of a particular implementation. A particular address may reside in the cache of a particular one of the cores 122 and 124. The IO scheduler 120 may have a mapping table to process cache hits to the core 122 and/or the core 124. The mapping table may help to update the cache memories of the cores 122 and 124. The IO scheduler 120 may also have the responsibility to switch the IO queue priority. For example, if the IO scheduler 120 finds a read to an address location (e.g., 0x1000) designated for a particular core (e.g., the core 122), after searching two queue depths the IO scheduler 120 may find an IO write request to the same address location (e.g., 0x1000) to be served by another core (e.g., the core 124). The IO scheduler 120 may then switch the priority of the IO write request, and then wait for an IO read request. By switching a priority, the IO scheduler 120 may prevent cache coherency inconsistencies and/or help improve performance during an update.

The system 100 may be implemented in a number of steps as shown in the following TABLE 1:

TABLE 1

| IO QUEUE AND IO SCHEDULER | | | | |
|---|---|---|---|---|
| STEP 1 | IO Q1 | IO READ | STRIPE SET 1 | CORE 1 |
| STEP 2 | I0 Q2 | IO WRITE | STRIPE SET 1 | CORE 2 |
| STEP 3 | IO Q1 | IO READ | STRIPE SET 2 | CORE 1 |
| STEP 4 | IO Q2 | IO READ | STRIPE SET 3 | CORE 2 |

TABLE 1 displays an overview of the IO scheduler 120 and mapping with respect to the stripe-sets (e.g., SS1-SSn) and the cores (e.g., the core 122 and the core 124) the IO scheduler 120 plans to assign the IO requests. In one example, the controller 102 may have two cores (e.g., the core 122 and the core 124). However, the logic may be scaled to implement multiple cores (e.g., three cores, four cores, etc.) depending on the design implementation.

The following example illustrates how four IO requests (e.g., a IO read for a stripe-set SS1, a IO write for the stripe-set SS1, a IO read for a stripe-set SS2, and a IO read for a stripe-set SS3) received from the IO scheduler 120 may be processed. The IO read from the stripe-set SS1 may be sent to the core 122 (e.g., the step 1) and the IO write for the stripe-set SS1 may be sent to the core 124 (e.g., the step 2) in parallel. Once the two IO requests (e.g., the IO read from the step 1 and the IO write from the step 2) have been processed, the next two IO requests (e.g., the IO read from the step 3 and the IO read from the step 4) may be sent to the core 122 and the core 124 based on availability. IO priority switching may be handled by the IO scheduler 120 in case the IO scheduler 120 finds that the IO read from the step 1 and the IO write from the step 2 target similar addresses (e.g., the core 124 changes a value while the core 122 is trying to read the old value). The IO scheduler 120 may then prioritize the IO write from the step 2 to complete first and schedule the IO read from the step 3 for the core 122 to work on instead of the IO read from the step 1. Prioritizing may proactively avoid cache coherency issues and performance issues in synching up all of the core caches.

A more detailed illustration of an example operation of the system 100 may be shown in the following TABLE 2:

TABLE 2

| | | | DISK 1 | DISK 2 | DISK 3 | DISK 4 | |
|---|---|---|---|---|---|---|---|
| STEP 1 | IO Q1 | IO READ | D1 | D2 | | | CORE 1 |
| STEP 2 | IO Q2 | IO WRITE | D1' | | | | CORE 2 |
| STEP 3 | IO Q2 | IO READ | D1' | D2 | D3 | P | CORE 2 |
| STEP 4 | IO Q2 | IO WRITE | D1' | D2 | D3 | P' | CORE 2 |
| STEP 5 | IO Q1 | IO READ | D4 | D5 | | | CORE 1 |
| STEP 6 | IO Q1 | IO READ | D1' | D2 | | | CORE 1 |
| STEP 6 | IO Q2 | IO READ | D7 | | | | CORE 2 |

An IO read of the step 1 and an IO write of the step 2 may be planned in parallel for the core 122 and the core 124. The IO scheduler 120 may determine that the core 122 is reading data (e.g., D1) while the core 124 is trying to modify the data D1 to a new data (e.g., D1'). The IO scheduler 120 may switch the priority of the IO write of the step 2 to be processed ahead of the IO read from the step 1. The IO scheduler 120 may then plan the IO read from the step 3 for the core 122 in place of the IO read from the step 1. For example, the IO read from the step 1 may be pushed to the next queue depth level (e.g., processed after the completion of the IO write from the step 2). The core 124 may work on the IO write from the step 2. The IO write from the step 2 may modify the data D1 to the new data D1'. The IO write from the step 2 may also modify a parity (e.g., P) to a new parity (e.g., P'). The IO scheduler 120 may lock access to the stripe-set (e.g., D1', D2, D3 and P) from the core 122 (or the core 124) to allow the core 124 (or the core 122) to process the IO write request from the step 2 to complete.

Once the IO scheduler 120 confirms the completion of the IO write from the step 2 (e.g., updating the data D1 to the new data D1'), the IO scheduler 120 may perform several activities. The IO scheduler 120 may check for any pending IO reads (or writes) having the data D1 value that have not been sent (or served) to the controller 102. The IO scheduler 120 may then invalidate those IO reads (or writes). For example, the IO scheduler 120 may invalidate an IO read request related to the data D1 which has not been sent to the controller 102 before the data D1 was updated to the data D1'. The IO scheduler 120 may then ask for an updated list of IO requests (e.g., updated IO read and/or IO write requests). Next, the IO scheduler 120 may update the cache of the core 122 and/or the core 124 with the new data D1' from the old data D1. In one example, the update may prevent the cache of the core 124 from serving the data D1 to the controller 102. Once the core 124 completes the IO write from the step 2, the core 124 may proceed with the IO write from the step 4.

To monitor the IO priority switching and the threshold for invalidating pending IO reads, the IO queue depth may be implemented by the controller firmware (e.g., IO scheduler 120) based on a particular design implementation and/or performance target. The IO scheduler 120 may have a mapping table for monitoring and tracking switches on pending IO requests to be sent to the controller 102. In one example, the IO scheduler 120 may change the IO priority based on an internal queue depth (e.g., by a monitoring process). The monitoring process may prevent the internal queue depth from becoming full by processing IO requests with a shorter processing time more often than IO requests with a longer processing time. The monitoring process may also prevent delayed processing of the IO read requests.

Figure 3:
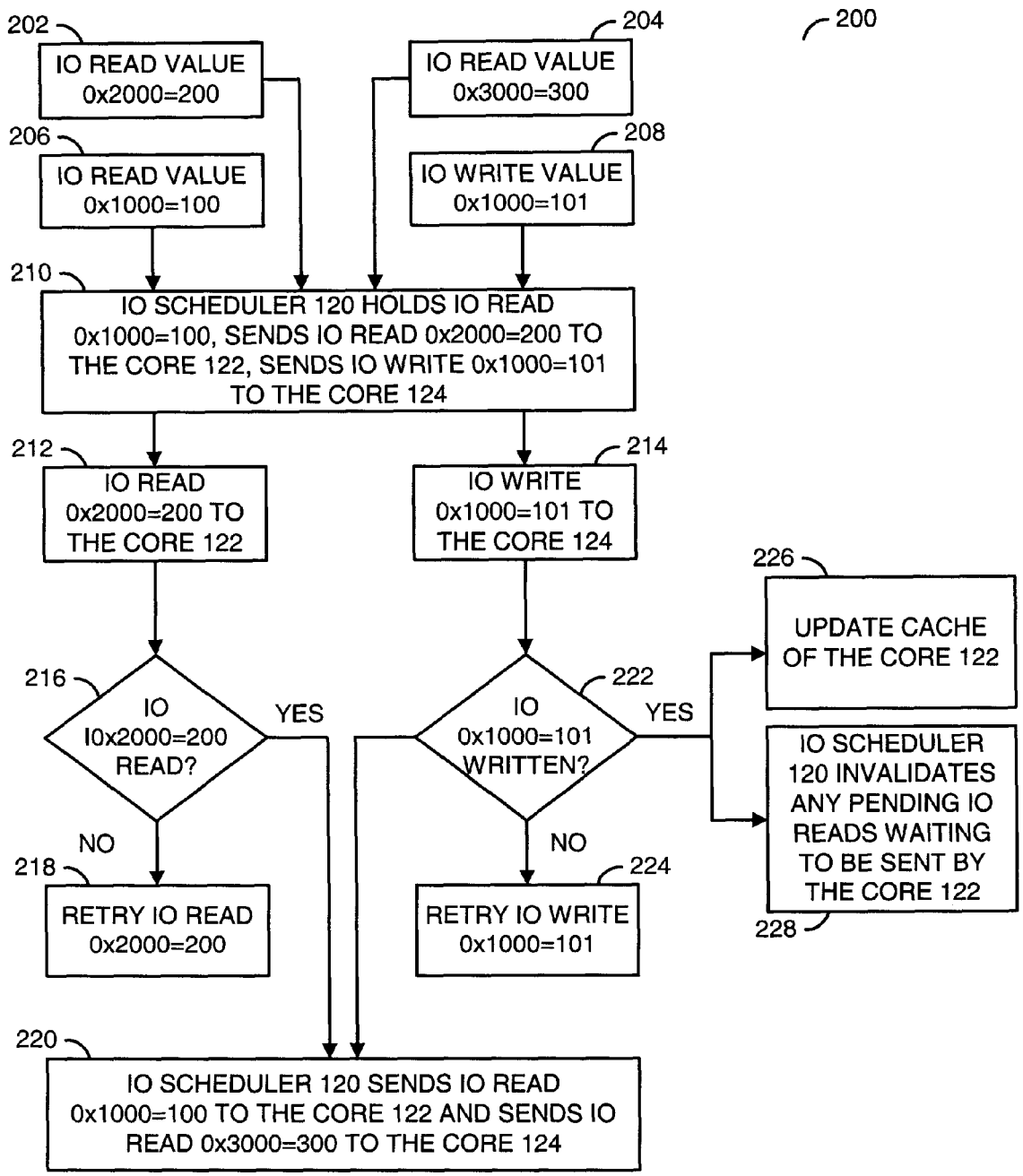
FIG. 3 is a flow diagram illustrating an embodiment of the present invention.

Referring to a FIG. 3, a flow diagram illustrating a process (or method) 200 is shown. The process 200 generally comprises a step (or state) 202, a step (or state) 204, a step (or state) 206, a step (or state) 208, a step (or state) 210, a step (or state) 212, a step (or state) 214, a decision step (or state) 216, a step (or state) 218, a step (or state) 220, a decision step (or state) 222, a step (or state) 224, a step (or state) 226, and a step (or state) 228. The state 202 may present an initial condition of an IO read request (e.g., with a value of 0x2000=200) to the IO scheduler 120. The state 204 may present an initial condition of an IO read request (e.g., with a value of 0x3000=300) to the IO scheduler 120. The state 206 may present an initial condition of an IO read request (e.g., with a value of 0x1000=100) to the IO scheduler 120. The state 208 may present an initial condition of an IO write request (e.g., with a value of 0x1000=101) to the IO scheduler 120. The state 210 may implement IO scheduling by (i) holding the IO read 0x1000=100 (e.g., implementing an IO priority switch), (ii) sending the IO read 0x2000=200 to the core 122, and/or (iii) sending the IO write 0x1000=101 to the core 124. In the state 212, the IO read 0x2000=200 may be sent to the core 122. In the state 214, the IO write 0x1000=101 may be sent to the core 124.

The decision state 216 may determine if the IO read 0x2000=200 is read by the core 122. If not, the method 200 may move to the state 218. In the state 218, the IO scheduler 120 may retry sending the IO read 0x2000=200 to the core 122. If so, the method 200 may move to the state 220. In the state 220, the IO scheduler 120 may implement an IO scheduling by (i) sending the IO read 0x1000=100 to the core 122 and/or (ii) sending the IO read 0x3000=300 to the core 124. The decision state 222 may determine if the IO write 0x1000=101 has been written by the core 124. If not, the method 200 may move to the state 224. In the state 224, the IO scheduler 120 may retry sending the IO write 0x1000=101 to the core 124. If so, the method 200 may move to the state 226 and to the state 220. In the state 226, the cache of the core 122 may be updated with the IO write 0x1000=101. In the state 228, the IO scheduler 120 may invalidate any pending IO reads (e.g., IO read requests with the value 0x1000) waiting to be sent by the core 122 to the LUN 104.

The functions performed by the diagram of FIG. 3 may be implemented using one or more of a conventional general purpose processor, digital computer, microprocessor, microcontroller, RISC (reduced instruction set computer) processor, CISC (complex instruction set computer) processor, SMID (single instruction multiple data) processor, signal processor, central processing unit (CPU), arithmetic logic unit (ALU), video digital signal processor (VDSP) and/or similar computational machines, programmed according to the teachings of the present specification, as will be apparent to those skilled in the relevant art(s). Appropriate software, firmware, coding, routines, instructions, opcodes, microcode, and/or program modules may readily be prepared by skilled programmers based on the teachings of the present disclosure, as will also be apparent to those skilled in the relevant art(s). The software is generally executed from a medium or several media by one or more of the processors of the machine implementation.

The present invention may also be implemented by the preparation of ASICs (application specific integrated circuits), Platform ASICs, FPGAs (field programmable gate arrays), PLDs (programmable logic devices), CPLDs (complex programmable logic device), sea-of-gates, RFICs (radio frequency integrated circuits), ASSPs (application specific standard products) or by interconnecting an appropriate network of conventional component circuits, as is described herein, modifications of which will be readily apparent to those skilled in the art(s).

The present invention thus may also include a computer product which may be a storage medium or media and/or a transmission medium or media including instructions which may be used to program a machine to perform one or more processes or methods in accordance with the present invention. Execution of instructions contained in the computer product by the machine, along with operations of surrounding circuitry, may transform input data into one or more files on the storage medium and/or one or more output signals representative of a physical object or substance, such as an audio and/or visual depiction. The storage medium may include, but is not limited to, any type of disk including floppy disk, hard drive, magnetic disk, optical disk, CD-ROM, DVD and magneto-optical disks and circuits such as ROMs (read-only memories), RAMs (random access memories), EPROMs (electronically programmable ROMs), EEPROMs (electronically erasable ROMs), UVPROM (ultra-violet erasable ROMs), Flash memory, magnetic cards, optical cards, and/or any type of media suitable for storing electronic instructions.

The elements of the invention may form part or all of one or more devices, units, components, systems, machines and/or apparatuses. The devices may include, but are not limited to, servers, workstations, storage array controllers, storage systems, personal computers, laptop computers, notebook computers, palm computers, personal digital assistants, portable electronic devices, battery powered devices, set-top boxes, encoders, decoders, transcoders, compressors, decompressors, pre-processors, post-processors, transmitters, receivers, transceivers, cipher circuits, cellular telephones, digital cameras, positioning and/or navigation systems, medical equipment, heads-up displays, wireless devices, audio recording, storage and/or playback devices, video recording, storage and/or playback devices, game platforms, peripherals and/or multi-chip modules. Those skilled in the relevant art(s) would understand that the elements of the invention may be implemented in other types of devices to meet the criteria of a particular application.

While the invention has been particularly shown and described with reference to the preferred embodiments thereof, it will be understood by those skilled in the art that various changes in form and details may be made without departing from the scope of the invention.

The invention claimed is:

1. A system comprising:
a scheduler configured to prioritize a plurality of input/output (IO) requests;
a first core configured to process one of said plurality of IO requests based on said prioritizing of said plurality of IO requests; and
a second core configured to process a different one of said plurality of IO requests based on said prioritizing of said plurality of IO requests, wherein said scheduler prioritizes said plurality of IO requests by invalidating one or more pending IO requests.

2. The system according to claim 1, wherein said IO requests are processed in parallel by said first core and said second core.

3. The system according to claim 1, wherein said scheduler prioritizes said plurality of IO requests based on an internal queue depth.

4. The system according to claim 1, wherein said scheduler asks for an updated list of said IO requests after invalidating said one or more IO requests.

5. The system according to claim 1, wherein said scheduler prioritizes said plurality of IO requests based on an availability of said first core.

6. The system according to claim 1, wherein said scheduler prioritizes said plurality of IO requests based on an availability of said second core.

7. The system according to claim 1, wherein a cache of said first core is updated with a new data.

8. The system according to claim 7, wherein a cache of said second core is updated with said new data.

9. The system according to claim 7, wherein pending IO requests relating to an old data are invalidated.

10. The system according to claim 1, wherein said scheduler is further configured to monitor a mapping of said plurality of IO requests.

11. The system according to claim 1, further comprising a server configured to generate said IO requests.

12. The system according to claim 11, further comprising a network connection configured to connect said server to said scheduler.

13. The system according to claim 12, wherein said network connection comprises a fibre channel connection.

14. A system comprising:
a server configured to generate a plurality of input/output (IO) requests;
one or more controllers configured to prioritize said plurality of IO requests;
a plurality of cores configured to process said plurality of IO requests based on said prioritizing of said plurality of IO requests; and
a network connection configured to connect said server to said one or more controllers, wherein said one or more controllers are further configured to prioritize said plurality of IO requests by invalidating one or more pending IO requests.

15. The system according to claim 14, wherein said IO requests are processed in parallel by said plurality of cores.

16. The system according to claim 14, wherein said one or more controllers prioritizes said plurality of IO requests based on an availability of a particular one of said controllers.

17. The system according to claim 14, wherein said one or more controllers ask for an updated list of said IO requests after invalidating one of said plurality of IO requests.

18. A system comprising:
a server configured to generate a plurality of input/output (IO) requests;
a scheduler configured to (i) prioritize said plurality of IO requests and (ii) monitor a mapping of said plurality of IO requests;
a plurality of cores configured to process said plurality of IO requests based on said prioritizing of said plurality of IO requests, wherein said scheduler prioritizes said plurality of IO requests based on an availability of each of said plurality of cores; and
a network connection configured to connect said server to said scheduler, wherein said scheduler is further configured to prioritize said plurality of IO requests by invalidating one or more pending IO requests.

* * * * *